United States Patent [19]

Rougeau

[11] 4,002,208
[45] Jan. 11, 1977

[54] PLOWING AND LEVEE CUTTING DEVICE

[76] Inventor: Adam Rougeau, 8670 Newfield Lane, Beaumont, Tex. 77707

[22] Filed: Mar. 12, 1975

[21] Appl. No.: 557,466

[52] U.S. Cl. .............................. 172/398; 172/318
[51] Int. Cl.² .................... A01B 3/24; A01B 13/00; A01B 63/22; A01B 63/32
[58] Field of Search .......... 172/321, 398, 423, 239, 172/318

[56] References Cited
UNITED STATES PATENTS

| | | | |
|---|---|---|---|
| 1,312,281 | 8/1919 | Springer | 172/318 |
| 1,324,101 | 12/1919 | Bohmker et al. | 172/423 |
| 2,408,936 | 10/1946 | Leland | 172/423 |
| 2,627,797 | 2/1953 | Acton | 172/321 X |
| 2,691,930 | 10/1954 | Forgy | 172/398 X |
| 2,735,348 | 2/1956 | Taylor | 172/321 X |
| 2,753,784 | 7/1956 | Wetzel | 172/321 X |
| R24,006 | 5/1955 | Acton | 172/321 X |

*Primary Examiner*—Paul E. Shapiro
*Attorney, Agent, or Firm*—William E. Kinnear

[57] ABSTRACT

The plow device is adjustable so that it can be pulled and operated by a powered tractor utilizing reciprocating lowering and lifting rods actuated by a 3 hitch hydraulic piston and piston rod attached to 3 respective hooks one hook pivotally connected to vertical posts and two oppositely disposed hooks connected to the opposed front ends of the frame of said plow device. The plow device has a pivotally connected shank connected by a pivot pin therethrough which also extends through horizontal side frame beams. The shank carries a plow blade point at its lower end which cuts levees, furrows or cultivates the ground with suitable kind of cultivating attachment. A pivotally connected L-shaped crank arm is pivotally connected by pivot pin through hole in said crank arm and matching holes in said horizontal side beams of the frame and the upper end of said crank arm has several adjustment holes spaced apart from each other for use attaching a pivotal member by pivot pin through a hole thereof and extending through one of the adjustment holes in the upper end of said crank arm. A hydraulically operated piston is actuated by hydraulic fluid in a cylinder by pipe and valves communicating with each end of the cylinder so that said piston may be actuated forward for drawing said crank arm forward to lift a trailing wheel from the ground for safely transporting said plow device and wheel to clear levees around sections of lands in a field to be cultivated for growing crops such as rice crops.

5 Claims, 3 Drawing Figures

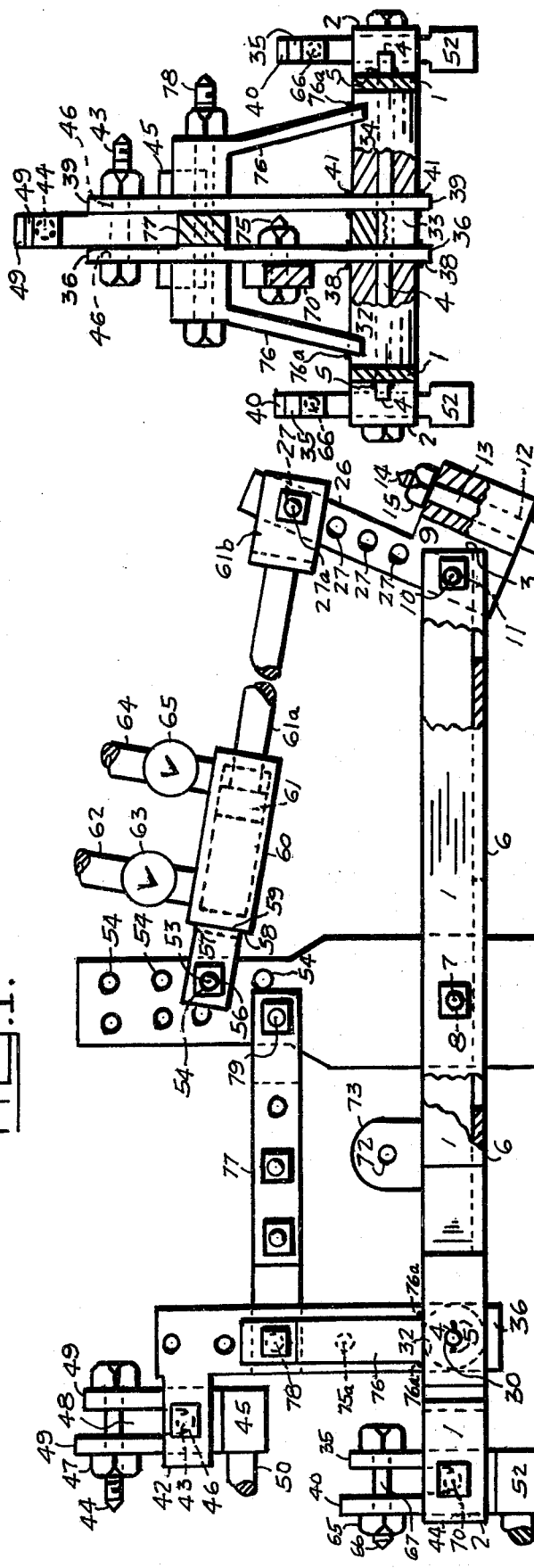
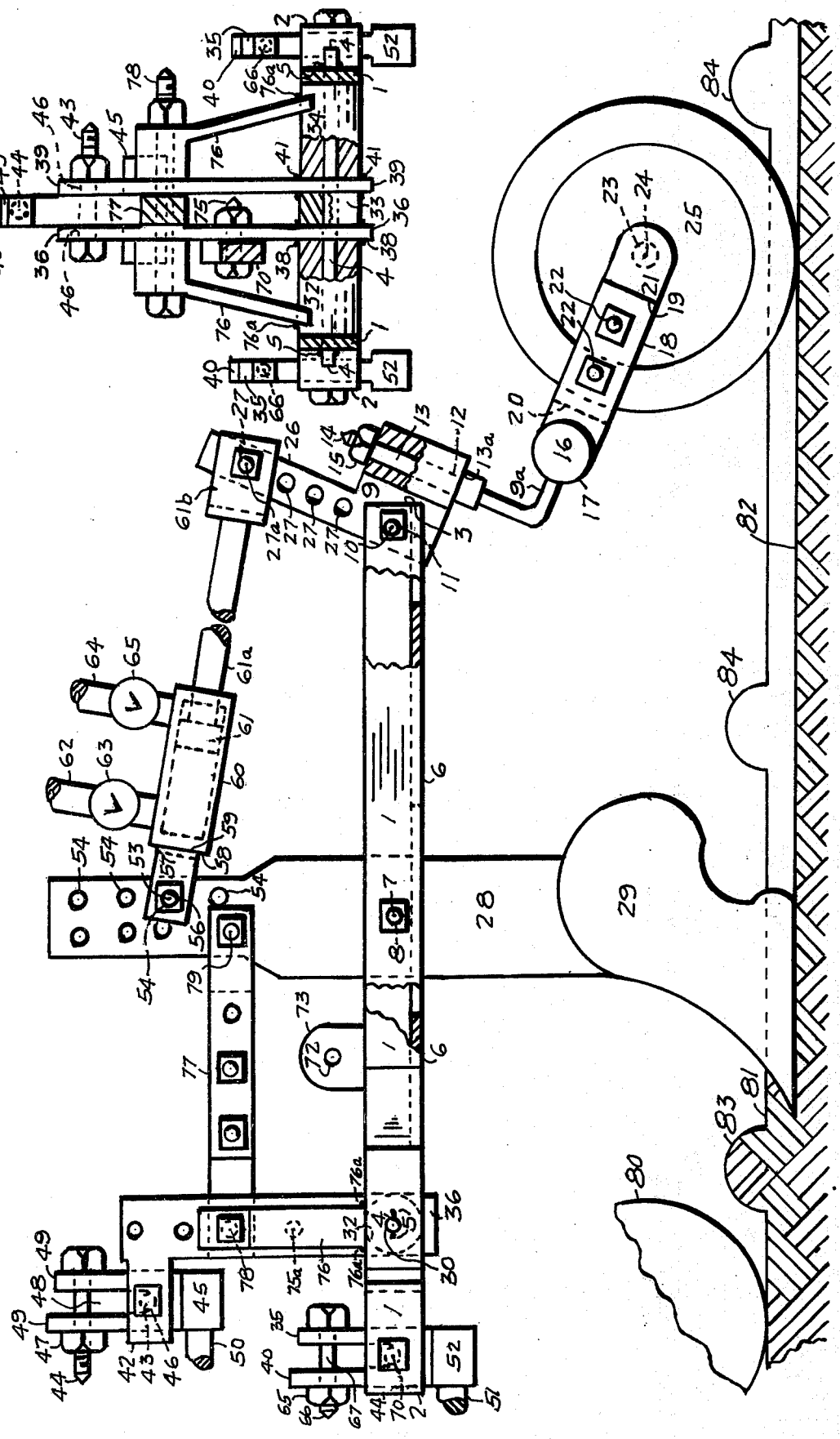

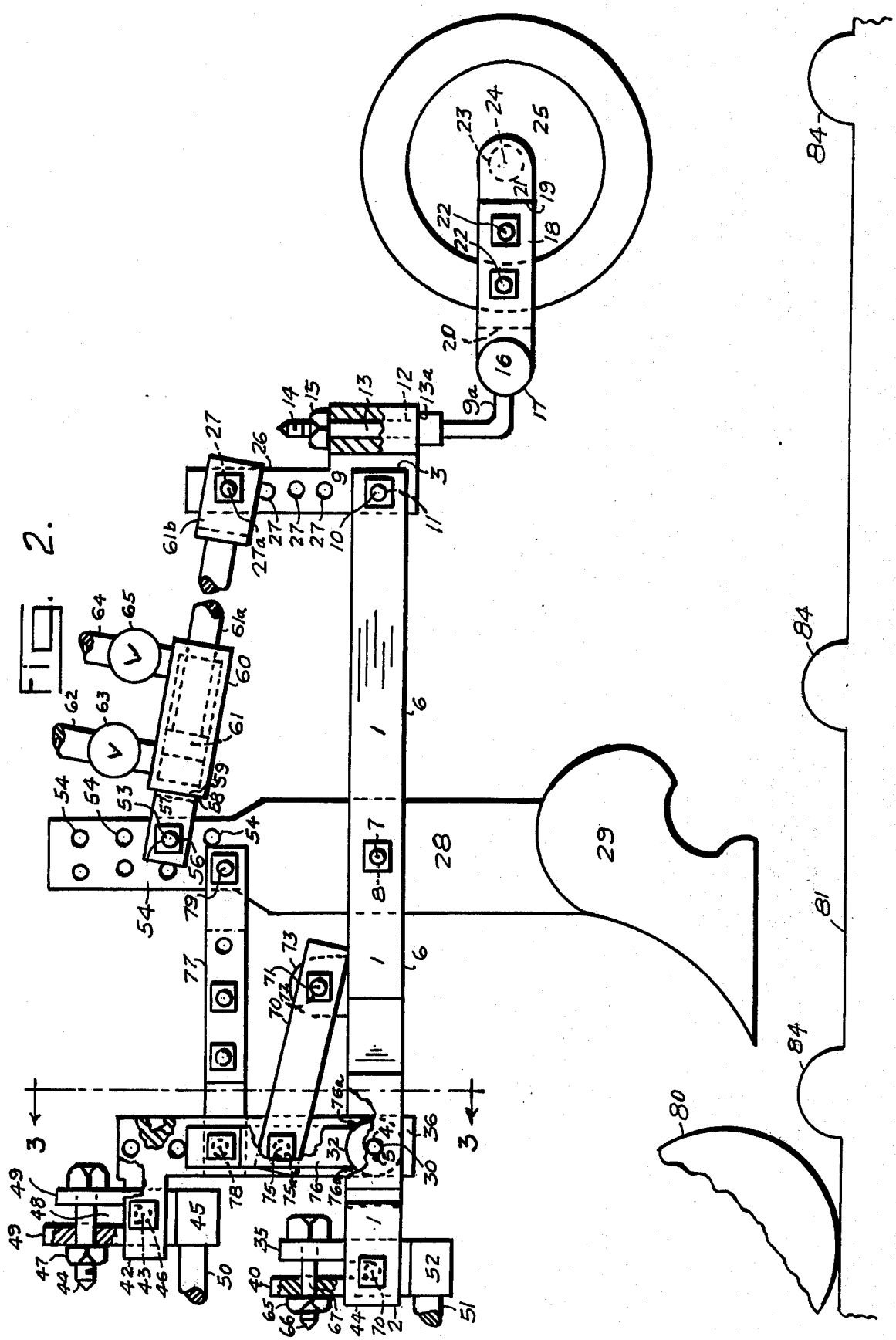

PLOWING AND LEVEE CUTTING DEVICE

The plow device relates to a plow device adjustably and pivotally attached to the rear end of power tractor with hydraulically operated pistons for lowering a plow attachment to cut levees surrounding sections to be cultivated to cut levees at plow depth if desired, and, for lifting said plow device clear of the ground for safely transporting said plow device from one location to another location.

An object of the invention is to provide a plow device which will precisely limit the depth of the furrow or levee to be cut which surrounds adjoining sections of lands in a field where crops are to grown therein such as rice crops that needs flooding by irrigating water channeled through the cut in the levee adjacent to each section of ground to be cultivated by cultivating attachments on the plow device and crops planted and grown in said cultivated sections.

Another object of the invention is to provide a plow device of the character described which is pulled and operated hydraulically for lifting said plow device by the hydraulic mechanisms of a tractor to clear the ground and levees surrounding same to quickly transport said plow device from one field to another field to be cultivated.

These and other objects of the invention will in part be obvious and will in part be more fully dislcosed in the specification, the drawings of which illustrate one embodiment of the invention, in which:

FIG. 1 is a vertical side view in elevation, partly sectional, of the plow device in operative position plowing furrow in surface of the ground or earth and showing cut through bordering or surrounding levees cut by the plow of said device shown in sectional view;

FIG. 2 is a vertical side view in elevation, partly sectional, of the plow device in lifted inoperative position for ready transporting from location to location without having to unhitch the plow from the tractor which powers and operates same; and, FIG. 3, is a cross sectional view taken on the line 3—3 of FIG. 2.

The numerals 1—1 denotes two horizontally positioned parallel channel beams spaced wide apart at the front ends 2—2 and narrow space therebetween at rear end 3—3 and is rigidly supported by cylindrical shaft 4 through horizontal matching holes adjacent the front ends 2—2 of beams 1—1 and welded thereto by weld 5. A shank 28 carrying a plow blade point 29 is pivotally connected between the narrowed space between said parallel beams 1—1 approximately midway of the length of said beams 1—1 by pivot pin 7 extending through matching holes 8—8 in said beams 1—1 and hole in said shank 28 supporting said beams 1—1 and yet providing pivotal movement of said shank for the upper and lower portion of said shank 28. A pivotal L-shaped crank arm 9 is pivotally attached near its lower end between said narrowed parallel beams 1—1 by pivot pin 10 extending through hole in said crank arm 9 and matching holes through sides of said parallel beams 1—1 which forms the frame generally indicated at numeral 6.

A vertical hole 12 is drilled through lower offset of the L-shaped vertical crank arm 9 through which a round turning pin 13 is fitted. A shoulder 13a on said turning pin 13 abuts the bottom of said pivotal L-shaped crank arm 9 adjacent the bottom of the vertical hole 12 therethrough. The threaded upper end 14 of said turning pin 13 on which nut 15 is secure said turning pin 13 in place yet allow said turning pin 13 to swivel in said vertical hole 12 thereof. A short distance below said shoulder 13a said vertical crank arm 9 is bent outward at 90° to the vertical portion of said turning pin 13 and the outer end 9a thereof is attached rigidly thereto to the middle of a horizontal cross bar 16. The front opposed ends 17—17 of said cross bar 16 is provided with a pair of paralled spaced wheel arms 18—18 extending outward from said cross bar 16 and perpendicular thereto. The outer ends 19—19 of said parallel spaced wheel arms 18—18 and the front ends 20—20 of extension ends 21—21 bolted to the rear ends of said wheel arms 18—18 by bolts and nuts 22 through matching holes 23—23. A horizontal axle 24 is journaled in indentures inside and adjacent the rear ends of extension ends 21—21 so that trailing roller wheel 25 can rotate on said axle 24 and swivel freely with said vertical portion of said turning pin 13.

The upper end 26 of said pivotal L-shaped crank arm 9 has four (4) adjustment holes 27. The lower end of said vertical pivotal shank 28 carries at its lower end plow blade point 29 as shown in FIGS. 1 and 2 of the accompanying drawings.

The cylindrical shaft 4 is fitted horizontally through matching holes 30—30 near the front ends of said parallel beams 1—1 and the opposed ends of said shaft 4 is is welded by welds 5—5 around said protruding ends of said shaft 4 to the outer surfaces of the beams 1—1 to secure the front ends of said beams together. Before welding said shaft 4 to beams 1—1 pipe sleeves 32, 33 and 34 in that order are sleeved over one end of the shaft 4 after inserting one end of the shaft 4 from outside into one of the matching holes 30—30 and then the shaft end inserted through other matching hole 30—30 and then both ends of shaft 4 welded by welds 5—5 to the outer surfaces of said matching holes of the beams 1—1, thus the sleeves 32-33 and 34 are free to revolve on said shaft 4 between the inner sides of said beams 1—1.

Between sleeve 32 and sleeve 33 is welded vertical post 36 by welds 38—38. and, between sleeve 33 and sleeve 34 is welded vertical post 39 parallel to post 36 by weld 41—41 and the upper ends of said spaced parallel posts 36 and 39 are attached by bolt 78 with pivotal link arm 77 nd the rear end of said pivotal link arm 77 is furcated and fits around centrally located shank 28 through one of the four (4) adjustment holes 54 spaced apart vertically in the upper end of shank 28 and said pivotal link arm furcation has matching holes therethrough with center hole in the upper end of said shank 28 to accommodate pivot pin 79 to pivotally link said pivotal link arm 77 on its forward end by pivot pin 78 and on the rear end of said pivotal link arm 77 pivotally connected to center hole in shank 28 by pivot pin 79 so that when sleeves 32, 33, and 34 with vertical parallel post 36 and 39 revolve slightly on shaft 4 as a unit the pivotal link arm 77 will alternately move forward or rearward slightly as said sleeves 32, 33 and 34 and vertical posts 36 and 39 revolve either forward or rearward will swing said shank 28 and its lower plow blade point 29 accordingly. This slight forward or rearward revolving movement allows the plow blade point 29 to compensate for any irregularity of the up and down movement of the plow blade point 29 during the plowing operation so that said plow blade point 29 can perform its function smoothly in taking a uniform cut to form the furrow cut by said plow blade point 29 at a true uniform depth, otherwise, if their was no pivotal movement of the plow shank 28 but rigid and stationary the plow blade point 29 would not guide and cut smoothly as can be done by utilizing the pivotal movement arrangement of the entire device.

The upper ends of said opposed spaced parallel posts 36 and 39 each have furcated forwardly extending projections 42—42 with horizontal matching holes 46—46 extending through said parallel projections 42—42 and slot 48 through hook 45 in upper end thereof through which slot 48 and matching holes 46—46 a bolt 44 extends secured by nut 47 to hold said U-shaped hook 45 for limited up and down movement in the elongated vertical slot 48 between said furcations 49—49 of hook 45 so that said entire plow device may be lowered to operative plowing position as shown in FIG. 1, or, lifted to inoperative position as shown in FIG. 2 of the drawings by means of hydraulic operated piston rod 50 which in part of the three point hydraulic hitch at the rear end of the tractor (not shown) this being the top central hitch attached to said piston 50. The other two piston rods 51—51 which are attached to opposed horizontal front hooks 52—52 in FIGS. 1 and 2 are likewise connected to the two opposed horizontal pistons and hydraulic system of the tractor (not shown) by which said entire plow device is lowered to operative plowing position as shown in FIG. 1, or lifted to inoperative position for safely transporting same over leevees or from location to location for use as shown in FIG. 2 of the Drawings. An example, of a three point hydraulic operated hitch is well known and is illustrated and described in the May 1971 issue of Parts Catalog PC 978 at pages 116 and 117 thereof of a 5020 tractor so equipped with three (3) point Hydraulic operated hitch manufactured and sold by John Deere Co., Inc., of Waterloo, Iowa.

In the present plow device attachment to a tractor having a three point hydraulic operated hitch above mentioned provides means to pull, lower or lift said plow device but the hydraulic operated piston 61 in hydraulic cylinder 60 which front end 58 of said cylinder 61 has head 57 attached thereto and front end of said head 57 has holes 56—56 to register with any of the matching vertically spaced adjustment holes 54 in the upper portion of vertical shank 28 which carries the plow blade point 29 through which said matching holes pivot pin 53 is inserted and secured by nut through said holes 56 in said head 57. The rear end of said said piston carries rearwardly extending piston rod 61a and the rear end thereof is attached to a furcated head 61b which furcated portion of head 61b has horizontal matching holes therethrough which is pivotally attched to any one of the spaced vertical holes 27 in the upper end of L-shaped crank arm 9 by pivot pin 27a thus said front head 57, hydraulic cylinder 60, piston 61 in said cylinder 60 and piston rod 61a and its head 61b when pivotally connected at it forward end by pivot pin 53 through holes 56 in forward head 57 and connected at its reward end by pivot pin inserted through matching horizontal holes in rear furcated head 61b and inserted through one of the spaced vertical holes 27 of the pivotal L-shaped crank arm 9. The trailing roller wheel 25 is attached to intermediate turning pin 13 and its 90° forming outer end 9a of said turning pin 13 said wheel 25 is hydraulically lowered to the ground therebeneath and can swivel and pivot freely and trail the bottom of the furrow 82 cut by the plow blade point 29. The position of the piston 61 in the hydraulic cylinder 60 determines the height of the elevation of the rear end of the plow device of bottom of wheel 25 on the ground which in turn determines the depth of the cut by the plow blade point 25 in the ground, thus the regulation of the depth of the cut is determined by the operator to the position he regultes the hydraulic fluid in the front and rear end of the piston 61 in the cylinder 60 and the hydraulic controls of the fluid is manipulated by the operator of the tractor to which the pipe 62 and its valve 63 and pipe 64 and its valve 65 extend by high pressure rubber hoses leading to the tractor and the course of supply of hydraulic fluid and hydraulic pump for pumping said fluid through either line 62 and its valve 63 or through line 64 and its valve 65, while such hydraulic system in the operation of said piston 61 in cylinder having fluid under pressure on both sides of said piston the mechanism to which said piston 61 and piston rod 61a arrangement is utilized to operate the pivotal L-shaped crank arm. Turning arm 13 has 90° bent portion 9a and connection to said trailing wheel 25 is novel arrangement and construction of its several parts to accompolish the result of determining the height of the rear end of the plow device herein is lowered or raised to fix the depths to which the plow blade point 29 can cut the depth of a furrow in the ground on which the wheel 25 touches the ground which is being plowed or cultivated.

The transporting bar 70 is rigidly attached by bolt 75 through hole in front end of said bar and said bolt 75 inserted through hole 75a in vertical post 36, and, the hole in the rear end of bar 70 a bolt 71 is inserted and through hole 72 in lug 73 at top of channel 1 to rigidly attach said bar 70 to hold all pivotal connections on the plow in rigid stiff alignment so that the entire plow device may be picked up as a unit in rigid position by the hydraulic system on tractor by raising the piston rods 50 and 51—51 connected to the U-shaped hooks 45 and 52—52 respectively to lift the entire plow device from the ground as a unit for safely transporting same for location to location for use, and, removing said bar 70 when the device is to be used in operative plowing position as shown in FIG. 1 of the drawings.

The rear wheel 80 of a tractor is shown which tractor pulls and lifts the plow device for transporting same and lowers said device to plow and cut through levees 83 in farming crops such as rice plants since water by irrigation is essential to the growth of rice as well as to kill or prevents weeds from growing around rice plants and sap the nourishment from the ground. By being able to cut through levees at plow depth while plowing furrows 82 at the same depth in the bordering levees in one adjacent section to another in a field being cultivted for rice is a great saving as this work is done by hand at present time such as shown of cut 84 through levees 83 in FIG. 1 and a gate is placed therein to keep each section flooded with water for a few days and then the water is drained off by removing the board gate or the like from said cut 84 and the water drained from each section so bordered by levees. This procedure is followed at different stages of growth of the rice plant until the rice starts making head of grain and then the watering is stopped to allow the grains of the heads to fully mature and ripen.

It is obvious that many changes may be made in the construction and arrangement of the parts of the device without departing from the spirit and scope of the invention.

Having thus described the invention, what I claim as new and desire to secure by Letters Patent, is:

1. A plowing and levee cutting device connected to the rear end of a tractor and having a horizontal frame to which is pivotally connected a vertical plow shank with a plow blade point on its lower end and trailing roller wheel pivotally mounted adjacent the lower bent end of a turning pin which swivels through the lower end of a crank arm that is pivotally mounted on a pivot pin connected adjacent the rear end of said frame, said crank arm having a vertically disposed upper portion which is pivotally connected to the rear end of a piston rod, a cylinder having a chamber therein, a piston movable in said cylinder chamber and connected to the forward end of said piston rod, the forward end of said cylinder connected to the upper end of said vertically disposed plow shank and the intermediate portion of said plow shank is pivotally connected to said frame, a vertical post forward of the upper end of said plow shank and the upper ends of said post and plow shank pivotally connected to a link arm, a pipe and a regulating valve thereon in communication with said cylinder chamber forward of said piston whereby fluid under pressure introduced through said pipe and said regulating valve in communication with said cylinder chamber forward of said piston will move said piston rearwardly to push the upper end of said crank arm rearwardly and move said turning pin downwardly to lower said wheel downwardly to touch the ground therebeneath and simultaneously move said plow blade point of said plow shank into the ground at desired depth and when said tractor pulls said device forward said plow blade point will cut furrow into the ground and make cut through a raised levee encountered surrounding the section of land in which plowed furrows are cut to cultivate said land.

2. A plow and levee cutting device connected to the rear end of a tractor and having a horizontal frame to which is pivotally connected a vertical plow shank with a plow blade point on its lower end and trailing roller wheel pivotally mounted adjacent the lower end of a turning pin which swivels through the lower end of a crank arm that is pivotally mounted on a pivot pin connected adjacent the rear end of said frame, said crank arm having a vertically disposed upper portion the lower end of which is pivotally connected to the rear end of a piston rod, a cylinder having a chamber therein, a piston movable in the chamber of said cylinder and connected to the forward end of said piston rod, the forward end of said cylinder connected to the upper end of said vertically disposed plow shank and the intermediate portion of said plow shank is pivotally connected to said frame, a pipe and a regulating valve thereon in communication with said cylinder chamber forward of said piston therein whereby fluid under pressure introduced through said pipe and said regulating valve in communication with said cylinder chamber forward of said piston will move said piston rearwardly to push the upper end of said crank arm rearwardly and move said turning pin downwardly to lower said wheel downwardly to touch the ground therebeneath and simultaneously move said plow blade point of said plow shank into the ground at desired depth and when said tractor pulls the device forward said plow blade point will cut a furrow and make cut through a raised levee encountered surrounding the section of land in which plowed furrows are cut to cultivate said land, said trailing wheel is positioned in trailing relationship to said plow blade point and trails in the furrow as the furrow is plowed by said plow blade point.

3. A plowing and levee cutting device connected to the rear end of a tractor and having a horizontal frame to which is pivotally connected a vertical plow shank with a plow blade point on its lower end and trailing roller wheel pivotally mounted adjacent the lower bent end of a turning pin which swivels through the lower end of a crank arm that is pivotally mounted on a pivot pin connected adjacent the rear end of said frame, said crank arm having a vertically disposed upper portion the lower end of which is pivotally connected to the rear end of a piston rod, a cylinder having a chamber therein, a piston movable in said cylinder chamber and connected to the upper end of said vertically disposed plow shank and the intermediate portion of said plow shank is pivotally connected to said frame, a vertical post forward of the upper end of said plow shank and the upper ends of said post and plow shank pivotally connected by a link arm, a hydraulically controlled piston rod extending rearwardly from said tractor and the rear end of said controlled piston rod is rigidly attached to an upper hitch which is attached to the upper end of said post thereby to keep said post in rigid position during the plowing operation, a pipe with a regulting valve thereon in communication with said cylinder chamber forward of said first named piston between the upper plow shank and the crank arm whereby fluid under pressure introduced through said pipe and regulating valve in communication with said cylinder chamber forward of said piston will move said piston rearwardly to push the upper end of said crank arm rearwardly and move said turning pin downwardly to lower said wheel downwardly to touch the ground therebeneath and simultaneously move said plow blade point to said plow shank into the ground at desired depth and when said tractor pulls the device forward said plow blade point will cut a furrow into the ground and cut through a raised levee encountered surrounding the section of land in which plowed furrows are cut to cultivate said land at the same depth of the cut taken by said plow blade point during the plowing operation.

4. A plowing and levee cutting device connected to the rear end of a tractor and having a horizontal frame to which is pivotally connected a vertical plow shank with a plow blade point on its lower end and trailing roller wheel pivotally mounted adjacent the lower bent end of a turning pin which swivels through the lower end of a crank arm that is pivotally mounted on a pivot pin connected adjacent the rear end of said frame, said crank arm having a vertically disposed upper portion the lower end of which is pivotally connected to the rear end of a piston rod, a cylinder having a chamber therein, a piston movable in said cylinder chamber and pivotally connected to the upper end of said vertically disposed plow shank and the intermediate portion of said plow shank is pivotally connected to said frame, a vertical post forward of the upper end of said plow shank and the upper ends of said post and plow shank pivotally connected by a link arm, hydraulically controlled piston rod extending rearwardly from said tractor and the rear end of said controlled piston rod is attached to an upper hitch which is attached to the upper end of said post to keep said post, pivotal link arm and upper plow shank in rigid positions during the plowing operation after the plow point blade and trailing wheel have been set at desired lowered positions for plowing, a pipe and a regulating valve thereon in communication with said chamber forward of said first named piston will move said piston rearwardly to push the upper end of said crank arm rearwardly and thus move said turning pin downwardly to lower said wheel downwardly to touch the ground therebeneath and simultaneously move said plow blade point of said plow shank into the ground at desired depth and when said tractor pulls the device forward said plow blade point will cut a furrow into the ground and make cut through a raised levee encountered surrounding the section of land in which plowed furrows are cut to cultivate said land, said trailing wheel trails on the ground in a rearward position thereto of said plow blade point adjacent the furrow plowed by said plow blade point during the plowing operation.

5. A plowing and levee cutting device connected to the rear end of a tractor and having a horizontal frame to which is pivotally connected a vertical plow shank with a plow blade point on its lower end and trailing roller wheel pivotally mounted adjacent the lower bent end of a turning pin which swivels through the lower end of a crank arm that is pivotally mounted on a pivot pin connected adjacent the rear end of said frame, said crank arm having a vertically disposed upper portion the lower end of which is pivotally connected to the rear end of a piston rod, a cylinder having a chamber therein, a piston movable in said cylinder chamber and connected to the forward end of said piston rod, the forward end of said cylinder rigidly connected to the upper end of said vertically disposed plow shank, a vertical post forward of the upper end of said plow shank, the upper ends of said post and plow shank pivotally connected together by a link arm, a hydraulically controlled piston rod extending rearwardly from said tractor with the rear end of said controlled piston rod attached to an upper hitch which is attached to the upper end of said post to keep said post, pivotal link arm and upper plow shank in rigid positions during the plowing operation after the plow point blade and trailing wheel have been set at desired lowered positions for plowing, operating fluid under pressure introduced through a pipe and a regulating valve into said first named cylinder chamber rearward of said piston therein that extends between the upper ends of said plow shank and said crank arm to move said first named piston rearwardly to pull the upper end of said crank arm forwardly and simultaneously lift said plow point and roller wheel above ground level at desired inoperative position, a transporting bar, the upper end of said bar rigidly attached to said post and the lower end of said bar is rigidly attached to said frame and angularly disposed thereto to hold all pivotal connections on said device in rigid alignment so that when said device is lifted upwardly from the ground as a unit by tractor hydraulic lifting means whereby said device may be safely transported from one location to another location by said tractor, and upon removing said bar from said device said device may again be put into operative position.

* * * * *